United States Patent [19]

Åkesson et al.

[11] 4,382,847
[45] May 10, 1983

[54] METHOD OF MANUFACTURING BONDED PRODUCTS OF CELLULOSE OR CELLULOSE DERIVATIVES

[76] Inventors: Arne Åkesson, Bygatan 28, 191 46 Sollentuna; Torbjörn Reitberger, Duvholmsgränd 16, 127 41 Skärholmen, both of Sweden

[21] Appl. No.: 262,064
[22] PCT Filed: Jul. 6, 1978
[86] PCT No.: PCT/SE78/00014
  § 371 Date: Mar. 6, 1980
  § 102(e) Date: Mar. 4, 1980
[87] PCT Pub. No.: WO80/00142
  PCT Pub. Date: Feb. 7, 1980

[51] Int. Cl.³ .............................................. C08G 2/02
[52] U.S. Cl. ..................... 204/159.12; 204/159.21; 264/22; 264/109
[58] Field of Search ............................ 156/62.2, 272; 204/159.12, 159.21; 264/22, 109

[56] References Cited
U.S. PATENT DOCUMENTS 2,668,133  2/1954  Brophy et al. .................. 156/272
3,140,197  7/1961  Heberlein et al. .............. 427/33
3,549,509  12/1970  Cosalina ....................... 204/159.12

FOREIGN PATENT DOCUMENTS 535652  4/1973  Switzerland .
1223760  3/1971  United Kingdom .

OTHER PUBLICATIONS

Moslemi, "Particle Board", vol. 1, p. 91, 1974, Southern Illinois University Press.

*Primary Examiner*—Michael W. Ball
*Attorney, Agent, or Firm*—Sughrue, Mion, Zinn, Macpeak and Seas

[57] ABSTRACT

In a method of manufacturing bonded products, comprised completely or partially of cellulose or a cellulose derivative, such as saw dust, wood chips, paper or vegetable fibres, a condensation resin between an aldehyde, preferably formaldehyde, and urea, melamine or a phenol type is used as an adhesive. The product is irradiated to at most 5 Mrad with ionising radiation. Then the material will undergo a certain cross-linking. Residual quantities of uncured adhesive substances are reduced at the same time. The radiation dose is adjusted so that residual quantities of aldehyde in the material will be reduced. Preferably, also the residual quantity of formaldehyde in the material is reduced. By adding additives containing olefinic, acrylic or comparable groups the extent to which cross-linking takes place is increased.

5 Claims, No Drawings

METHOD OF MANUFACTURING BONDED PRODUCTS OF CELLULOSE OR CELLULOSE DERIVATIVES

It is well known that so-called ionising radiation, both mechanically produced radiation and that obtained from natural sources, can cause chemical and physical changes in polymeric material. Thus, some polymeric materials obtain an increase in their molecular weight and in their melting point subsequent to being exposed to such radiation, owing to the fact that new chemical bonds are formed in the material. Other polymers are influenced to a lesser extent or are decomposed into products of lower molecular weight, the mechanical properties of these polymers often being impaired at the same time.

The effect caused by the radiation can be influenced in some way, by exposing the polymer to said radiation in the presence of various additives, for example in a manner such that a material which has been decomposed can also be re-linked and the properties thereof improved thereby. Further, it has been found that the presence of air when irradiating the material also has a certain significance, since in many cases the oxygen accelerates the decomposition of the material.

It is also known that cellulose, cellulose derivatives and various natural cellulose composites, such as wood and vegetable fibres, belong to those polymeric materials most sensitive to radiation. If one excepts an insignificant positive effect at very small doses, i.e. $\leq 10$ krad, the mechanical properties of these materials are greatly impaired with increasing doses of radiation. It is also known that the properties of a plurality of condensation polymers between formaldehyde and urea, melamine or different phenol types, are impaired by radiation.

The present invention is based on the surprising discovery that chipboard or particle board bonded with formaldehyde-urea-resin exhibits highly improved mechanical properties subsequent to exposing the board to radiation.

The invention relates to a method of manufacturing bonded products which may be comprised fully or partially of cellulose or cellulose derivative, e.g. saw dust, wood chips, paper or vegetable fibres, the adhesive used being a condensation resin between an aldehyde, e.g. formaldehyde, and urea, melamine or a phenol type, and its widest aspect is mainly characterised by the fact that the product is irradiated to at most 5 Mrad with ionising radiation, the material undergoing a certain degree of cross-linking and residual quantities of uncured adhesive substances being reduced simultaneously therewith. One Mrad corresponds to an amount of energy taken up in the material of 10 Joule/g or 10 Ws/g.

In order to improve the properties of the aforementioned products, it is also desirable to be able to increase the content of aldehyde in the adhesive. This cannot be done, however, without the surplus being removed in some way. The present invention constitutes a significant step forward in this respect, owing to the fact that, in addition to improving the mechanical properties of the products, the radiation also contributes to reducing the residual content of aldehyde in the material.

The invention can also be applied together with various additives containing those functional groups which experience has shown will improve the extent to which cross-linking takes place when the material is subjected to radiation. An example of such an additive is hydrocarbon with olefinic, acrylic or other comparable groups. It also lies within the scope of the invention to modify the adhesive substance itself, in a manner such that these groups are chemically bound to one or more of the components of the resin.

EXAMPLE 1

Five groups of four test plates of chipboard or particle board bonded with urea-formaldehyde-resin were irradiated with $^{60}Co\gamma$-radiation in different dosages, and the surface hardness of the plates was determined at different locations by forcing a ball into the surface of the plates.

| Dose (Mrad) | Surface hardness (working units) |
|---|---|
| Blind-test | 2.17 ± 0.13 |
| 0.10 | 2.41 ± 0.03 |
| 0.33 | 2.35 ± 0.06 |
| 1.0 | 2.31 ± 0.09 |
| 4.0 | 2.28 ± 0.06 |
| 10 | 2.12 ± 0.12 |

EXAMPLE 2

Four groups of four test plates of the type described above were irradiated with $^{60}Co\gamma$-radiation in different dosages, whereafter test rods measuring 60×13.9×16 mm were manufactured from the plates and impact tested at a distance of 46.8 mm between the points of impact.

| Dose (Mrad) | Energy absorbed (kpcm) |
|---|---|
| Blind-test | 10.4 ± 0.1 |
| 0.10 | 12.1 ± 0.6 |
| 0.33 | 10.6 ± 0.5 |
| 1.0 | 11.0 ± 0.3 |
| 10 | 9.7 ± 0.5 |

The plates were irradiated at room temperature and exposed to the effect of oxygen in the air. The dosing rate was approximately 0.04 krad/s.

The material may also be irradiated at elevated temperatures and at other dosing rates than those mentioned here. Slightly improved effects can be expected, in actual fact, when the dosing rate is increased, owing to the fact that the extent to which linking takes place is then more pronounced.

The above examples show that the radiation gives similar changes in the properties of the selected materials. The most noticeable improvement was already obtained at 0.10 Mrad. It will also be understood that the material can be irradiated to dosages of several Mrad, without lowering the mechanical strength of the material, compared with non-irradiated samples. This is of great significance when the irradiating step is primarily intended to eliminate residual quantities of formaldehyde.

The material may be irradiated during the manufacture of the bonded product or in immediate conjunction therewith. Alternatively the material may be irradiated at a later stage, for example when the product is substantially finished and ready for use, or even shortly after the material has been put into use. When the said product has the form of a semi-manufacture, the irradiating operation—if it has not previously been carried out—may be undertaken when the semi-manufacture is converted to the final product.

The irradiating operation can be carried out either with the intention of influencing the surface layer of the material or in a manner such as to cause the radiation to pass completely through the material. In the former case, it is an advantage to use a less expensive and simpler type of accelerator.

We claim:

1. A method of manufacturing particle board, comprised completely or partially of cellulose or a cellulose derivative, such as saw dust, wood chips, paper or vegetable fibres, the adhesive used being a condensation resin between an aldehyde, preferably formaldehyde, and urea, melamine or a phenol type, characterised by irradiating the product to 0.1 Mrad to 5 Mrad with ionising radiation, so that the material will undergo a certain cross-linking, residual quantities of uncured adhesive substances being reduced simultaneously therewith.

2. A method according to claim 1, characterised by adjusting the radiation dose in a manner such as to reduce the residual quantities of aldehyde in the material.

3. A method according to claim 2, characterised by reducing the residual quantity of formaldehyde in the material.

4. A method according to claim 1, characterised by increasing the extent to which cross-linking takes place by adding additives containing olefinic, acrylic or comparable groups.

5. A method according to claim 1, characterised by increasing the extent to which cross-linking takes place by modifying the adhesive substance itself, in a manner that olefinic, acrylic or comparable groups are chemically bound to one or more of the components of the resin.

* * * * *